Jan. 21, 1930.  A. J. NELSON ET AL  1,744,492
DRYING OR HEATING
Filed Oct. 15, 1926  2 Sheets-Sheet 1

Inventors
Albin J. Nelson
Robert W. Neel
By their Attorneys
Ward, Crosby & Smith

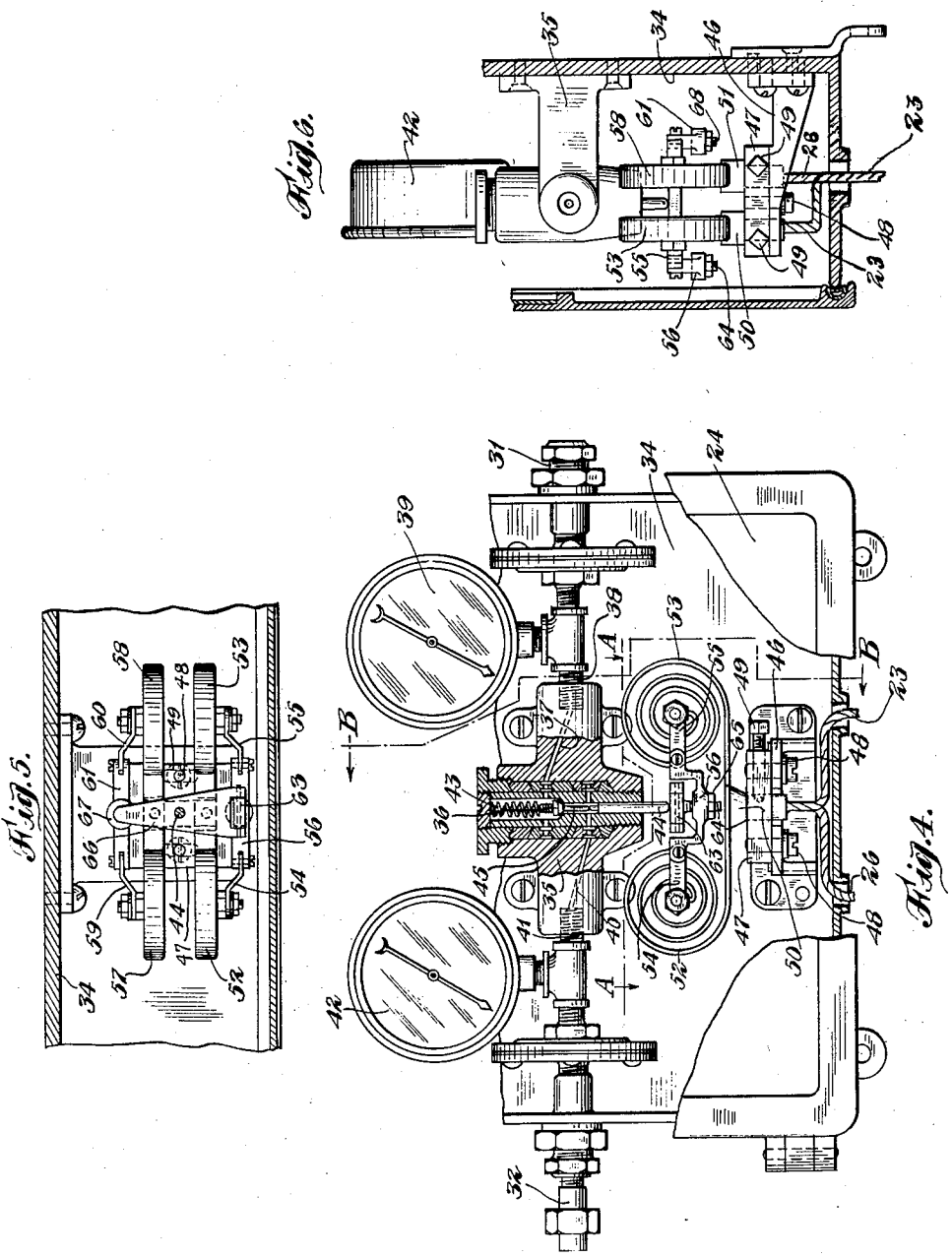

Patented Jan. 21, 1930

1,744,492

UNITED STATES PATENT OFFICE

ALBIN J. NELSON, OF BROOKLYN, NEW YORK, AND ROBERT W. NEEL, OF DULUTH, GEORGIA, ASSIGNORS, BY MESNE ASSIGNMENTS, TO CONSOLIDATED ASHCROFT HANCOCK COMPANY, INC., OF NEW YORK, N. Y., A CORPORATION OF DELAWARE

DRYING OR HEATING

Application filed October 15, 1926. Serial No. 141,696.

Our invention relates to improvements in drying or heating and more particularly to improvements in methods and apparatus for drying or heating various materials, including cotton goods, paper and other products. The main object of the invention is to provide an improved automatic control whereby the drying or heating may be carried out automatically and more efficiently to the desired extent.

Further and more specific objects, features and advantages will more clearly appear from the detail description given below taken in connection with the accompanying drawings which form a part of this specification. In the drawings which illustrate a preferred form of apparatus for the drying of cotton threads, etc., Fig. 1 is a side elevational view; Fig. 2 is a detail illustrating the method of arranging one of the thermometric bulbs inside one of the drums; Fig. 3 is a detail illustrating the arrangement of one of the thermometric bulbs adjacent the rotary drums; Fig. 4 is an enlarged view of a portion of the regulating or control apparatus, certain parts being broken away in order to more clearly illustrate the same; and Fig. 5 is a transverse section taken on a line A—A of Fig. 4; and Fig. 6 is a section taken on the line B—B of Fig. 4.

Referring to the drawings, 7 represents a suitable side frame of a machine in which hollow rotary drums 8 and 9 are journaled. The cotton threads wet with sizing, or other materials to be dried or heated are brought adjacent to and passed over these drums as indicated by line 10, the same first passing around the drum 8 and then around the drum 9 and then over idlers 11 and 12. 13 represents a steam inlet pipe through which steam is passed through pipe 14 from which leads a branch pipe extending into the drum 9 at its axis on the back side thereof as viewed in Fig. 1. Another branch pipe also extends from the pipe 14 and leads into the drum 8 at its axis on the back side thereof as viewed in Fig. 1, thus steam is supplied to the inside of the drums 8 and 9 for the purpose of heating the same. 15 represents a valve connected in the supply pipe 14 and operated by a diaphragm motor 16 in order to control the admission of steam or other heating fluid into the drums 8 and 9. 17 represents a by-pass for the steam or other heating fluid around the valve 15. Manually operated valves 18, 19 are located in the pipe 14, one on either side of the valve 15. 20 represents an automatic pressure controller connected between the pipe 13 and the pipe 14 in order to limit the pressure of the heating fluid supplied to the pipe 14 to the desired value. 21 represents a manually operated valve connected between the device 20 and the pipe 13. Located within the drum container 8 is a thermometric bulb 22 filled with mercury or other suitable medium. This bulb is connected by suitable armored tubing 23 to the control apparatus 24 hereinafter more particularly described. 25 represents another thermometric bulb arranged outside of the drums but adjacent the surface of the drum 9 and at a point just prior to that at which the material to be dried leaves the drum 9. This thermometric bulb is connected by an armored tubing 26 to the control apparatus 24. Another thermometric bulb similar to the bulb 25 is placed adjacent thereto and is connected by armored tubing 27 to a recording thermometer 28. Also a thermo-metric bulb similar to the bulb 22 is placed within the cylinder or drum 9 and is connected to the recording thermometer 28 by armored tubing 29. All of the thermo-metric bulbs are preferably filled with mercury and the armored tubing connected thereto filled with mercury whereby variations in temperature on the bulbs cause the mercury to expand and so act responsive to variations in temperature at the points at which the bulbs are located. 30 represents an air supply pipe through which air under pressure is supplied through connection 31 to control apparatus 24, which under certain conditions of operation permits the air under pressure to be supplied to pipe 32 which extends down the front side of the apparatus as viewed in Fig. 1 and then underneath the same and up the other side to a pipe 33 leading to the diaphragm motor 16, whereby air under pressure is supplied to the diaphragm motor 16 to operate the valve 15.

Referring to Figs. 4, 5 and 6, the control or regulating apparatus there shown consists of a suitable casing having a back plate 34 to which is secured a bracket 35 in which is located a pilot valve 36. Pilot valve 36 is designed to control the passage of air under pressure from connection 31 to connection 32. For this purpose the bracket 35 is provided with a conduit 37 leading to pipe connection 38 which in turn is suitably connected to pipe connection 31, pressure gauge 39 being connected in this connection to indicate the pressure of the air supplied to the arrangement. On the other side the bracket member 35 is provided with a conduit 40 leading to a pipe connection 41 which is connected to the connection 32, the pressure gauge 42 being suitably connected in this connection to indicate the pressure of the air supplied to the pipe 32. A spring 43 normally holds the valve 36 against the seat so that air cannot pass from the conduit 37 to the conduit 40. 44 represents a spindle slidably mounted in the bracket 35 and adapted to operate a smaller spindle 45 which in turn, when raised by the spindle 44 as viewed in Fig. 4, raises the valve 36 from its seat against the action spring 43 and so permits the air under pressure from conduit 37 to flow about the valve 36 and around the spindle 45 to the conduit 40 and so out to the connection 32.

46 represents another bracket secured to the plate 34 and arranged on the bracket 46 is a plate 47. The plate 47 may be adjusted to and from the back plate 34 on the bracket 46 and secured in various adjusted positions by means of screws 48 passing through slots 49 respectively in the bracket 46 and screw threaded into the plate 47 (see also Fig. 5). Extending through and rigidly secured in the plate 46 by screws 49 are connecting members 50 and 51. These connecting members also extend through a suitable slot in the bracket 46 so that the plate 47 carrying the members 50 and 51 is still permitted to slide on bracket 46. Supported on the member 50 are two expansible hollow coil springs 52 and 53. The outer ends of these springs are connected to the member 50 and the member 50 is provided with a conduit to which the armored tubing 23 is connected for the purpose of connecting the same with both of the hollow springs 52 and 53. To the inner ends of these springs are rigidly connected lever arms 54 and 55 respectively and the outer ends of said arms 54 and 55 are pivotally connected by suitable slotted connections with an intervening U shaped member 56. Thus if the temperature in the drum or container 8 rises to a certain extent, the mercury in the bulb 22 will expand causing the mercury in the tubing 23 and springs 52 and 53 to be put under greater pressure, thereby causing the springs 52 and 53 to expand so that the lever arms 54 and 55 are thereby rocked upwardly and thereby move the U shaped member 56 upwardly as viewed in Fig. 4.

The other connecting member 51 is suitably connected to the armored tubing 26 and also has secured thereto two hollow coiled expansible springs 57 and 58 similar to the springs 52, 53, and the inner ends of the springs 57 and 58 being rigidly secured to lever arms 59 and 60 respectively, the outer ends of which are suitably connected by slotted connections to an intervening member 61. Thus if the temperature at the bulb 25 rises to a certain extent it will cause the mercury therein to expand and so compress the mercury in the flexible tubing 26 and in the springs 57 and 58 connected thereto so that the springs 57 and 58 will expand and cause the lever arms 59 and 60 to rock upwardly thus moving the member 61 upwardly. 63 represents a member having a shank 64 screw-threaded into the U shaped member 56 and secured in adjusted position by nut 65. Pivotally mounted on the member 63 is one end of a lever member 66, the other end of which is adapted to rest on a member 67 adjustably secured to the member 61 by having a screw-threaded shank 68 screw-threaded into the member 61. Thus if the member 56 is raised, it raises the lever member 66 while the other end of the lever member rests upon the member 67 as the fulcrum point, and if the member 61 is raised, this will raise the rear end of the lever member 66 while the other end of the lever 66 is supported at its pivotal point on the member 63 as a fulcrum point. The spindle or pin 44 is adapted to rest on the lever member 66 intermediate these fulcrum points at the respective ends of the lever member 66.

In operation the drums 8 and 9 are rotated in any suitable manner and steam is admitted through the pipes 13 and 14 etc. to the inside of the drums in order to heat the same. If the temperature in the drum 8 tends to exceed a predetermined value as measured by the thermo-metric bulb 22 therein, the hollow springs 52 and 53 will expand sufficiently to raise the member 56 and consequently one end of the lever member 66 and thereby the spindle 44 so that the valve 36 is opened thereby permitting air under pressure to flow from the supply pipe 31 to the connection 32 and diaphragm motor 16 so as to close the valve 15 in the steam supply pipe and thus shut off the steam supply and prevent the temperature in the drum 8 from materially exceeding such predetermined value. Likewise if the temperature outside of the drum and adjacent the material being dried at the bulb 25, exceeds a predetermined value as measured by the bulb 25, the springs 57 and 58 will be caused to expand thus raising the member 61 and so raising other end of the lever member 66 and thereby raising the spindle 44 and so causing it to open the valve 36 and again permit air under pressure to flow from the supply 31 to the connection 32 and diaphragm motor 16 to close the valve 15 and thus shut off the supply of heating fluid to the cylinders and so prevent temperature at or adjacent the bulb 25 from exceeding materially the predetermined value for which the apparatus is set. When the temperatures at the bulbs 22 and 25 drop below the predetermined value, in question, the parts will return to their normal position and the valve 36 will be closed under the action of spring 43, thereby permitting the diaphragm motor to open the valve 15 under the action of its spring and again permit heating fluid to flow to the drums 8 and 9 until a further reduction in the supply of heating fluid is brought about by the control as above specified.

Thus as the threads or other material are run around the steam heated drums, the amount of steam admitted is so controlled as to dry the threads uniformly and regardless of variations in speed of the apparatus or weight of the goods. Heretofore in such arrangements the control of heating fluid has been merely with respect to the temperature inside of the drum, but this is inadequate to give satisfactory drying since variations due to manufacturing processes and the fluctuations in atmospheric temperature outside the drum also affect the drying, and thus bring about wide variations in the moisture content of the material after it is dried, whereas in many cases it is desirable to bring about the drying or heating so as to remove all but a certain percentage of the moisture. Inasmuch as the skin temperature of the drum depends upon the amount of water to be evaporated in a given time (which varies with the number of threads and the speed of the machine), the ratio of conduction of heat from the inside to the skin (which varies with the difference in temperature), and the atmospheric temperature, it will be seen that with a constant temperature on the inside the skin temperature must vary greatly and it follows therefrom that if it does vary greatly, uniform drying is impossible. It will be seen, however, that by providing the arrangement and method described wherein the admission of heating fluid to the drums is controlled or limited not only responsive to certain variations in temperature in the drum but also responsive to certain variations in temperature adjacent the material outside of the drum and preferably as it is about to leave the heating operation, extremely uniform drying may be obtained. Not only is one thermo-metric bulb placed inside of the drum so that it is affected by the temperature therein, but another bulb is located in such a position that it is affected by the room temperature as well as by radiation from the drum and its action on the control apparatus is such that an increase in temperature at this point will cause a decrease in the temperature inside of the drums and vice versa.

Assume for example that the apparatus is about to be started. Steam is turned on while the machine is standing still. The bulb 25 will not feel the effect of the heat until all of the metal of the drum or drums is thoroughly heated. This causes the control apparatus to permit the temperature on the inside of the drum to rise to a point somewhat higher than normal and for this purpose the apparatus is set so that the bulb 22 does not act to shut off the steam until the temperature within the drum has been raised to a point somewhat higher than normal. This reduces the time required for heating up. As the drum heats up and radiation from the drums affects the outside bulb 25, the controlling temperature point will be gradually lowered. The machine may then be started and as the wet yarn or cotton threads comes into contact with the drums, the skin temperature thereof is lowered, radiation diminishes and the falling temperature at the outside bulb 25 will cause the controller to admit more steam to the drum. When the machine is in operation a current of air of a temperature affected both by the room temperature and the temperature of the drums will pass the bulb 25 so that the final temperature to which the material is subjected is maintained substantially constant by the action of the bulb 25. When starting up the apparatus in the morning when room temperature may be low and the drying of the yarn or threads is slow, the correspondingly lower temperature at the outside bulb 25 will cause the drums to be heated to a higher temperature but as the room temperature rises and the threads after leaving the drum continue to dry the temperature of the drums is gradually reduced automatically. Also many times each day the apparatus has to be stopped. Ordinarily in such case the normal skin temperature of the drum naturally is considerably lower than the temperature of the steam inside of the drum. When the drum stops and the cooling effect of evaporating a considerable amount of water is removed, the skin temperature will rise rapidly. With our method and apparatus, however, when the machine stops the current of air referred to above stops, and also radiation from the drum 9 is more effective on the bulb 25 so that the temperature of this bulb will rise and cause the controlling apparatus to shut off the steam from the drum. As soon as the apparatus is started again, normal running conditions will be automatically and quickly restored.

70 and 71 represent drain pipes connected to the drums 8 and 9 respectively at their axis. When the apparatus is started the incoming steam is at first rapidly condensed and the water of condensation is caused to flow out through the pipes 70 and 71. After the apparatus has become heated up the valves 72 and 73 are closed and the valves 74 and 75 are opened and the water of condensation thereafter is permitted to flow out through water traps 76 to the outlet 78.

While we have described our improvements in great detail and with respect to a preferred embodiment thereof, we do not desire to be limited to such details or embodiments since many changes or modifications may be made and various of the improvements utilized in widely different forms and for various different purposes without departing from the spirit and scope of the patents in their broader aspects. Hence we desire to cover all modifications and forms coming within the language or scope of any one or more of the appended claims.

What we claim as new and desire to secure by Letters Patent is:

1. The arrangement for drying or heating materials having in combination a container to which a hot fluid is supplied to heat the same and adjacent which container the material is brought, a valve for regulating the admission of hot fluid to the container, means for regulating the valve responsive to variations in temperature in the container, said means including a thermometric bulb in the container, a coiled expansible hollow spring controlled by the bulb and means whereby expansion of the spring acts to regulate said valve, and means regulating said valve responsive to certain variations in temperature outside said container, said last mentioned means including a thermometric bulb outside the container, a coiled expansible hollow spring controlled by said last mentioned bulb and means whereby expansion of said last mentioned spring acts to regulate said valve.

2. The combination of a container, a valve, a pilot valve controlling said first mentioned valve, a lever member for actuating said pilot valve, said lever member having two fulcrum points and acting on said pilot valve intermediate said points, an expansible hollow coiled spring acting on the lever at one of said points, an expansible hollow spring acting on the lever at the other of said points, a thermometric bulb operatively connected to the first spring, and a thermometric bulb operatively connected to the other spring.

3. The combination of a valve, means controlling said valve including a lever member having two fulcrum points with the point to which the work is applied between said fulcrum points, an expansible hollow coiled spring acting on the lever at one of said points, an expansible hollow spring acting on the lever at the other of said points, a thermometric bulb operatively connected to the first spring, and a thermometric bulb operatively connected to the other spring.

4. The combination of a valve, means controlling said valve including a lever member having two fulcrum points with the point to which the work is applied between said fulcrum points, an expansible hollow coiled spring acting on the lever at one of said points, an expansible hollow spring acting on the lever at the other of said points, a thermometric bulb operatively connected to the first spring, a thermometric bulb operatively connected to the other spring, and means whereby the said work point may be adjusted at different distances from said fulcrum points.

5. The combination of two thermometric bulbs, two expansible hollow coiled springs operatively connected to said bulbs respectively, a lever member having two fulcrum points, one spring acting on the lever member at one of said fulcrum points and the other spring acting on the lever member at the other of said fulcrum points, and means acted upon by said lever member intermediate said fulcrum points.

In testimony whereof we have signed our names to this specification.

ALBIN J. NELSON.
ROBERT W. NEEL.